United States Patent
Cui et al.

(10) Patent No.: US 10,019,957 B2
(45) Date of Patent: Jul. 10, 2018

(54) LIQUID CRYSTAL DISPLAY AND ELECTRONIC DEVICE

(71) Applicant: Wuhan China Star Optoelectronics Technology Co., Ltd., Wuhan, Hubei (CN)

(72) Inventors: Hongqing Cui, Guangdong (CN); Wenqing Song, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 323 days.

(21) Appl. No.: 15/023,774

(22) PCT Filed: Mar. 4, 2016

(86) PCT No.: PCT/CN2016/075573
§ 371 (c)(1),
(2) Date: Mar. 22, 2016

(87) PCT Pub. No.: WO2017/143630
PCT Pub. Date: Aug. 31, 2017

(65) Prior Publication Data
US 2018/0090089 A1   Mar. 29, 2018

(30) Foreign Application Priority Data
Feb. 23, 2016 (CN) .......................... 2016 1 0097742

(51) Int. Cl.
G09G 3/36 (2006.01)
G02F 1/1333 (2006.01)
G02F 1/1368 (2006.01)

(52) U.S. Cl.
CPC .......... *G09G 3/3677* (2013.01); *G02F 1/1368* (2013.01); *G02F 1/13336* (2013.01); *G09G 2300/02* (2013.01); *G09G 2330/023* (2013.01)

(58) Field of Classification Search
CPC ............. G09G 3/3677; G09G 2300/02; G09G 2330/023; G02F 1/1368; G02F 1/13336
See application file for complete search history.

(56) References Cited

U.S. PATENT DOCUMENTS

| 7,582,900 B2 | 9/2009 | Itoh et al. |
| 2011/0260987 A1 | 10/2011 | Zhao et al. |

FOREIGN PATENT DOCUMENTS

| CN | 201957154 U | 8/2011 |
| CN | 102346658 A | 2/2012 |
| CN | 105280145 A | 1/2016 |
| JP | 2005091627 A | 4/2005 |

*Primary Examiner* — Vijay Shankar
*Assistant Examiner* — Abhishek Sarma
(74) *Attorney, Agent, or Firm* — Andrew C. Cheng

(57) ABSTRACT

The present disclosure discloses a liquid crystal display, including a main screen, a second screen, a driving circuit, a controlled switch and a power source, the second screen includes a second screen array substrate, the main screen includes a main screen array substrate, the power source provides a power supply signal to the main screen array substrate directly, and supplies a power signal to the second screen array substrate by the controlled switch, the driving circuit provides a first control signal to the controlled switch in order to turn off the controlled switch, by which the second screen array substrate obtains the power supply signal, or provides a second control signal to the controlled switch in order to turn off the controlled switch, by which the second screen array substrate fails to obtain the power supply signal.

11 Claims, 2 Drawing Sheets

LIQUID CRYSTAL DISPLAY AND ELECTRONIC DEVICE

FIELD OF THE DISCLOSURE

The present disclosure relates to a liquid crystal technology field, and more particularly to a liquid crystal display and an electronic device.

BACKGROUND OF THE DISCLOSURE

With the development of technology, a liquid crystal display has been employed in sorts of electronic devices as a display panel with high resolution. Much emphasis has been laid upon display effects, design, style, costs, penetrating rates of a liquid crystal display panel due to improvement of the liquid crystal display panel technology.

To meet requirements of customers, electronic devices have been equipped with various screens, such as a single screen or double screens. An electronic device with double screens includes a main screen and a second screen, which are separated and capable of working respectively, showing different data so as to improve user experience. However, a conventional electronic device with double screens sends driving signals to the main screen and the second screen during controlling driving signals of the main screen and the second screen, which means sending driving signals to the main screen and the second screen simultaneously, it is hard to control driving signals of the double screens, consuming more energy of the electronic device.

Overall, a liquid crystal display and an electronic device are necessary to be provided to solve the problem above.

SUMMARY OF THE DISCLOSURE

The technical issue that the present disclosure solves is to provide a liquid crystal display and an electronic device, which can control a driving signal of a main screen and that of a second screen respectively, reducing energy consumption of an electronic device effectively.

To solve the technical problem above, a proposal offered by the disclosure is: providing a liquid crystal display, which includes a main screen, a second screen, a driving circuit, a controlled switch and a power source, the second screen includes a second screen array substrate, the main screen includes a main screen array substrate, the power source provides a power supply signal to the main screen array substrate directly, and supplies the power signal to the second screen array substrate by the controlled switch, the driving circuit provides a first control signal to the controlled switch in order to turn off the controlled switch, by which the second screen array substrate obtain the power signal, or provides a second control signal to the controlled switch in order to turn off the controlled switch, by which the second screen array substrate fails to obtain the power supply signal; the second screen array substrate is designed as pixel embedded in memory; the liquid crystal display further includes a main screen scanning circuit, the driving circuit provides a second trigger signal to the main screen scanning circuit, the main screen scanning circuit responds to the second trigger signal so as to scan the main screen array substrate, ordering the main screen to display dynamically.

The liquid crystal display further includes a second screen scanning circuit, when the driving circuit provides the first control signal to the controlled switch, a first trigger signal is further provided to the second screen scanning circuit, the second screen scanning circuit responds to the first trigger circuit so as to scan the second screen array substrate, ordering the second screen to display dynamically; the driving circuit provides the first control signal to the controlled switch, and when the first control signal is not provided to the second screen scanning circuit, the second screen scanning circuit discontinues scanning the second screen array substrate, ordering the second screen to display statically.

To solve the technical problem above, another proposal provided by the disclosure is: providing a liquid crystal display, which includes a main screen, a second screen, a driving circuit, a controlled switch and a power source, the second screen includes a second screen array substrate, the main screen includes a main screen array substrate, the power source provides a power supply signal to the main screen array substrate directly, and the power supply signal is provided to the second screen array substrate by the controlled switch, the driving circuit provides a first control signal to the controlled switch in order to turn off the controlled switch, by which the second screen array substrate obtains the power supply signal, or a second control signal is provided to the controlled switch in order to turn off the controlled switch, by which the second screen array substrate fails to obtain the power supply signal.

The second screen array substrate is designed as pixel embedded in memory.

The liquid crystal display further includes a second screen scanning circuit, when the driving circuit provides the first control signal to the controlled switch, a first trigger signal is further provided to the second screen scanning circuit, the second screen scanning circuit responds to the first trigger circuit so as to scan the second screen array substrate, ordering the second screen to display dynamically.

The driving circuit provides the first control signal to the controlled switch, and when the first control signal is not provided to the second screen scanning circuit, the second screen scanning circuit discontinues scanning the second screen array substrate, ordering the second screen to display statically.

The controlled switch includes a first controlled switch and a second controlled switch, the power source is equipped with a first power signal output terminal and a second power signal output terminal, the first power signal output terminal outputs a first power supply signal, the second power signal output terminal outputs a second power supply signal, the first controlled switch includes a first controlled terminal, a first connection terminal and a second connection terminal, the second controlled switch includes a second controlled terminal, a third connection terminal and a fourth connection terminal, the first power signal output terminal and a first power signal input terminal of the main screen array substrate are connected, the second power signal output terminal and a second power signal input terminal of the main screen array substrate are connected; the first power signal output terminal and the first connection terminal are connected, the second power signal output terminal and the third connection terminal are connected, the second connection terminal and a first power signal input terminal of the second screen array substrate are connected, the fourth connection terminal and a second power signal input terminal of the second screen array substrate are connected; the first controlled terminal and the second controlled terminal are connected; the driving circuit provides the first control signal or the second control signal to the first controlled terminal.

The first power supply signal is high electric potential, the second power supply signal is low electric potential.

The first controlled switch and the second controlled switch are NPN-type triodes.

The first controlled switch and the second controlled switch are NMOS-type triodes.

The liquid crystal display further includes a main screen scanning circuit, the driving circuit provides a second trigger signal to the main screen scanning circuit, the main screen scanning circuit responds to the second trigger signal so as to scan the main screen array substrate, ordering the main screen to display dynamically.

To solve the technical problem above, another proposal provided by the disclosure is: providing an electronic device, the electronic device includes a liquid crystal display, the liquid crystal display includes a main screen, a second screen, a driving circuit, a controlled switch and a power source, the second screen includes a second screen array substrate, the main screen includes a main screen array substrate, the power source provides a power supply signal to the main screen array substrate directly, and the power supply signal is provided to the second screen array substrate by the controlled switch, the driving circuit provides a first control signal to the controlled switch in order to turn off the controlled switch, by which the second screen array substrate obtains the power supply signal, or a second control signal is provided to the controlled switch in order to turn off the controlled switch, by which the second screen array substrate fails to obtain the power supply signal.

The second screen array substrate is designed as pixel embedded in memory.

The liquid crystal display further includes a second screen scanning circuit, when the driving circuit provides the first control signal to the controlled switch, a first trigger signal is further provided to the second screen scanning circuit, the second screen scanning circuit responds to the first trigger circuit so as to scan the second screen array substrate, ordering the second screen to display dynamically.

The driving circuit provides the first control signal to the controlled switch, and when the first trigger signal is not provided to the second screen scanning circuit, the second screen scanning circuit discontinues scanning the second screen array substrate, ordering the second screen to display statically.

The controlled switch includes a first controlled switch and a second controlled switch, the power source is equipped with a first power signal output terminal and a second power signal output terminal, the first power signal output terminal outputs a first power supply signal, the second power signal output terminal outputs a second power supply signal, the first controlled switch includes a first controlled terminal, a first connection terminal and a second connection terminal, the second controlled switch includes a second controlled terminal, a third connection terminal and a fourth connection terminal, the first power signal output terminal and a first power signal input terminal of the main screen array substrate are connected, the second power signal output terminal and a second power signal input terminal of the main screen array substrate are connected; the first power signal output terminal and the first connection terminal are connected, the second power signal output terminal and the third connection terminal are connected, the second connection terminal and a first power signal input terminal of the second screen array substrate are connected, the fourth connection terminal and a second power signal input terminal of the second screen array substrate are connected; the first controlled terminal and the second controlled terminal are connected; the driving circuit provides the first control signal or the second control signal to the first controlled terminal.

The first power supply signal is high electric potential, the second power supply signal is low electric potential.

The first controlled switch and the second controlled switch are NPN-type triodes.

The first controlled switch and the second controlled switch are NMOS-type triodes.

The liquid crystal display further includes a main screen scanning circuit, the driving circuit provides a second trigger signal to the main screen scanning circuit, the main screen scanning circuit responds to the second trigger signal so as to scan the main screen array substrate, ordering the main screen to display dynamically.

Benefits of the disclosure: distinguishing from a conventional technique, a liquid crystal display of the disclosure includes a main screen, a second screen, a driving circuit, a controlled switch and a power source, the second screen includes a second screen array substrate, the main screen includes a main screen array substrate, the power source supplies a power signal to the main screen array substrate directly, and supplies the power signal to the second screen array substrate by the controlled switch, the driving circuit provides a first control signal to the controlled switch in order to turn off the controlled switch, by which the second screen array substrate obtain the power signal, or provides a second control signal to the controlled switch in order to turn off the controlled switch, by which the second screen array substrate fails to obtain the power signal. The disclosure further discloses an electronic device. By the method above, the disclosure is capable of controlling a driving signal of the main screen and that of the second screen separately, reducing energy consumption of an electronic device.

DETAILED DESCRIPTION OF PREFERRED EMBODIMENTS

Embodiments of the present disclosure are described in detail with reference to the accompanying drawings as follows.

Figure 1:
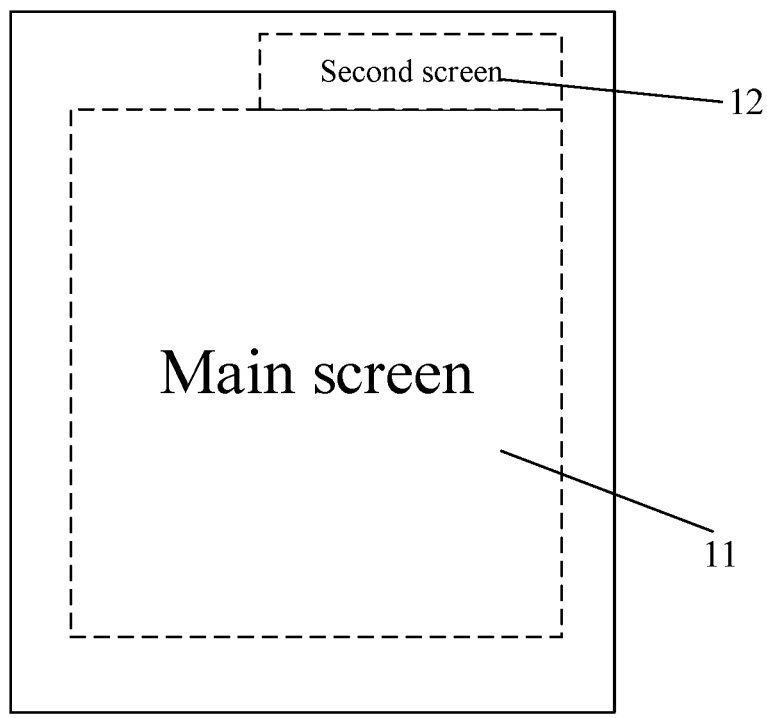
FIG. 1 is a structural diagram of an electronic device according to the present disclosure.
Figure 2:
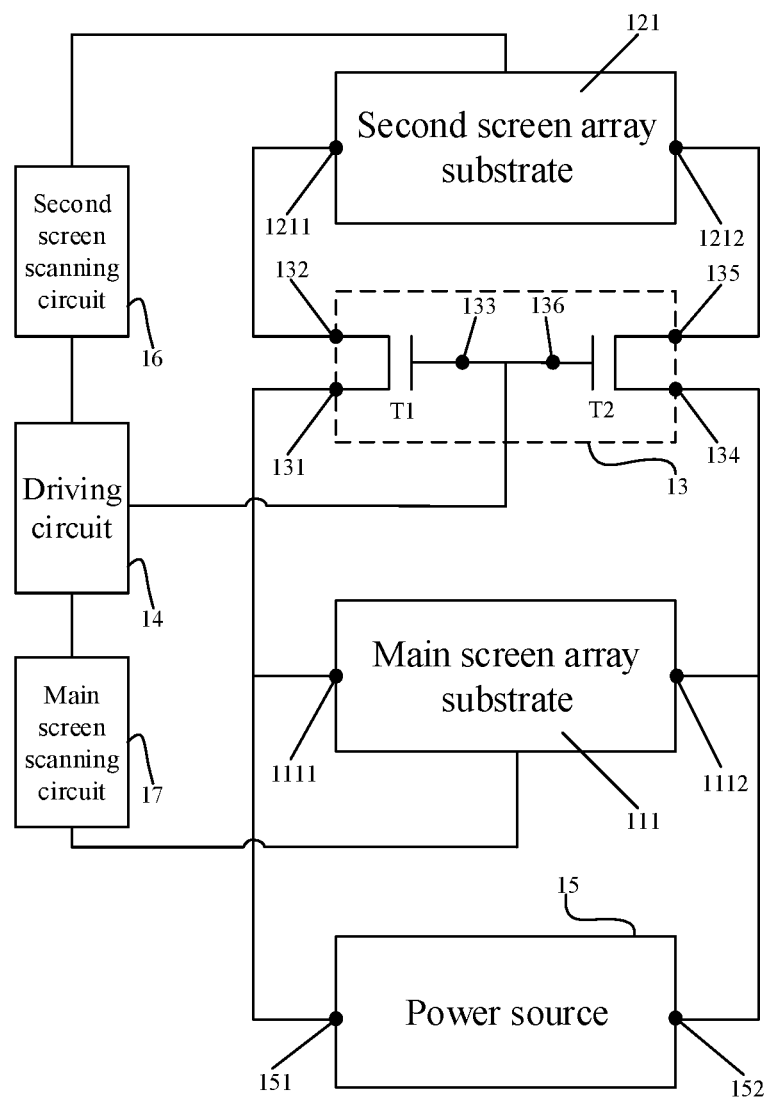
FIG. 2 is a structural diagram of a liquid crystal display according to the present disclosure.

The disclosure discloses an electronic device, as shown in FIG. 1 and FIG. 2, the electronic device includes a liquid crystal display, the liquid crystal display includes a main screen 11, a second screen 12, a driving circuit 13, a controlled switch 14, a power source 15, a second screen scanning circuit 16 and a main screen scanning circuit 17. In the embodiment, the electronic device can be preferably a mobile phone, a tablet, IPAD, a television.

The main screen 11 includes a main screen array substrate 111, the main screen array substrate 111 is equipped with a first power signal input terminal 1111 and a second power signal input terminal 1112.

The second screen 12 includes a second screen array substrate 121, the second screen array substrate 121 is equipped with a first power signal input terminal 1211 and a second power signal input terminal 1212.

The power source 15 provides a power supply signal to the main screen array substrate 121 directly. Specifically, the power source 15 is equipped with a first power signal output terminal 151 and a second power signal output terminal 152, the first power signal output terminal 151 and a first power signal input terminal 1111 of the main screen array substrate 111 are connected, the second power signal output terminal 152 and a second power signal input terminal 1112 of the main screen array substrate 111 are connected. In the embodiment, the first power signal output terminal 151 outputs a first power supply signal, the second power signal output terminal 152 outputs a second power supply signal, the first power supply signal is high electric potential, the second power supply signal is low electric potential.

The power source 15 provides a power supply signal to the second screen array substrate 121 by a controlled switch 13. Specifically, the controlled switch 13 includes a first controlled switch T1 and a second controlled switch T2, the first controlled switch T1 includes a first controlled terminal 133, a first connection terminal 131 and a second connection terminal 132, the second controlled switch T2 includes a second controlled terminal 136, a third connection terminal 134 and a fourth connection terminal 135. The first power signal output terminal 151 and the first connection terminal 131 are connected, the second power signal output terminal 152 and the third connection terminal 134 are connected. The second connection terminal 132 and a first power signal input terminal 1211 of the second screen array substrate 121 are connected, the fourth connection terminal 135 and a second power signal input terminal 1212 of the second screen array substrate 121 are connected; the first controlled terminal 133 and the second controlled terminal 136 are connected.

In the embodiment, the first controlled switch T1 and the second controlled switch T2 are both NMOS-type triodes, the first connection terminal 131 of the first controlled switch T1 and the third connection terminal 134 of the second controlled switch T2 are source electrodes of the NMOS, the second connection terminal 132 of the first controlled switch T1 and the fourth connection terminal 135 of the second controlled switch T2 are drain electrodes of the NMOS, the first controlled terminal 133 of the first controlled switch T1 and the second controlled terminal 136 of the second controlled switch T2 are gate electrodes of the NMOS.

In other embodiments, the first controlled switch T1 and the second controlled switch T2 are both NPN-type triodes, the first connection terminal 131 of the first controlled switch T1 and the third connection terminal 134 of the second connection terminal T2 are emitters of the NPN-type triodes, the second connection terminal of the first controlled switch T1 and the fourth connection terminal of the second controlled switch T2 are current collectors of the NPN-type troides, the first controlled terminal 133 of the first controlled switch T1 and the second controlled terminal 136 of the second controlled switch T2 are base electrodes of the NPN-type triodes.

The driving circuit 14 and the first controlled terminal 133 of the controlled switch 13 are connected, applied a first control signal or a second control signal to the controlled switch 13. When the driving circuit 14 provides the first control signal to the controlled switch 13, the first controlled switch T1 and the second controlled switch T2 are turned off, the power source 15 and the second screen array substrate 121 are intercommunicated, the second screen array substrate 121 achieves a power supply signal. When the driving circuit 14 provides a second control signal to the controlled switch 13, the first controlled switch T1 and the second controlled switch T2 are disconnected, the power source 15 and the second screen array substrate 121 are block, the second screen array substrate 121 cannot obtain a power supply signal.

In the embodiment, the driving circuit 14 further provides a first trigger signal to a second screen scanning circuit 16, the second screen scanning circuit 16 is applied to scan the second screen array substrate 121. Specifically, when the driving circuit 14 provides the first control signal to the controlled switch 13, and provides the first trigger signal to the second screen scanning circuit 16, the second screen scanning circuit 16 responds to the first trigger circuit to scan the second screen array substrate 121, ordering the second screen 12 to display dynamically. When the driving circuit 14 provides the first control signal to the controlled signal 13, and discontinues providing the first trigger signal to the second screen scanning circuit 16, the second screen scanning circuit 16 discontinues scanning the second screen array substrate 121 to order the second screen to display statically. Display dynamically and statically are both lit, display dynamically means images in the screen are dynamically, display statically means images in the screen are statically.

When the driving circuit 14 discontinues providing the first control signal to the controlled switch 13, the first controlled switch T1 and the second controlled switch T2 are both cut off, the power source 15 is not able to provide a power supply signal to the second screen array substrate 121, at this time the second screen 12 does not work, displaying dimly.

In the embodiment, the driving circuit 14 is further applied to provide a second trigger signal to the main screen scanning circuit 17, the main screen scanning circuit 17 is applied to scan the main screen array substrate 111. Specifically, the driving circuit 14 provides a second trigger signal to the main screen scanning circuit 17, the main screen scanning circuit 17 responds to the second trigger signal so as to scan the main screen array substrate 111, ordering the main screen 11 to display dynamically. Operational principle of the dynamic display of the main screen 11 and the second screen 12 is same with that of a conventional liquid crystal display.

In the embodiment, the second screen array substrate 121 is designed as pixel embedded in memory, when the second screen 12 displays statically, the pixel embedded in memory can freeze an image of the second screen 12, the second screen 12 shows the same image for a long term, which makes the second screen 12 can display statically. No signal refresh is necessary during static display, which equals to the driving circuit 14 does not need to provide the first control signal to the controlled switch 13, power consumption of the second screen 12 during static display is one tenth of that during dynamic display, consequently the power consumption of the second screen 12 is low when some static image such as a clock is displayed.

Overall, the liquid crystal display of the disclosure includes a main screen, a second screen, a driving circuit, a controlled switch and a power source, the second screen includes a second screen array substrate, the main screen includes a main screen array substrate, the power source provides a power supply signal to the main screen array substrate directly, and supplies a power signal to the second screen array substrate by the controlled switch, the driving circuit provides a first control signal to the controlled switch in order to turn off the controlled switch, by which the second screen array substrate obtains the power supply signal, or provides a second control signal to the controlled switch in order to turn off the controlled switch, by which the second screen array substrate fails to obtain the power supply signal. The disclosure further provides an electronic device. By the method above, the disclosure is capable of controlling a driving signal of the main screen and that of the second screen separately, reducing energy consumption of an electronic device.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A liquid crystal display, wherein it comprises a main screen, a second screen, a driving circuit, a controlled switch and a power source, the second screen comprises a second screen array substrate, the main screen comprises a main screen array substrate, the power source provides a power supply signal to the main screen array substrate directly, and the power supply signal is provided to the second screen array substrate by the controlled switch, wherein the driving circuit provides a first control signal to the controlled switch in order to turn off the controlled switch, by which the second screen array substrate obtains the power supply signal, or a second control signal is provided to the controlled switch in order to turn off the controlled switch, by which the second screen array substrate fails to obtain the power supply signal;

wherein the second screen array substrate is designed as pixel embedded in memory;

the liquid crystal display further comprising a main screen scanning circuit, the driving circuit providing a second trigger signal to the main screen scanning circuit, the main screen scanning circuit responding to the second trigger signal so as to scan the main screen array substrate, ordering the main screen to display dynamically, wherein the liquid crystal display further comprises a second screen scanning circuit, when the driving circuit provides the first control signal to the controlled switch, a first trigger signal is further provided to the second screen scanning circuit, the second screen scanning circuit responds to the first trigger circuit so as to scan the second screen array substrate, ordering the second screen to display dynamically;

the driving circuit providing the first control signal to the controlled switch, and when the first control signal is not provided to the second screen scanning circuit, the second screen scanning circuit discontinuing scanning the second screen array substrate, ordering the second screen to display statically.

2. A liquid crystal display, wherein it comprises a main screen, a second screen, a driving circuit, a controlled switch and a power source, the second screen comprises a second screen array substrate, the main screen comprises a main screen array substrate, the power source provides a power signal to the main screen array substrate directly, and the power signal is provided to the second screen array substrate by the controlled switch, wherein the driving circuit provides a first control signal to the controlled switch in order to turn off the controlled switch, by which the second screen array substrate obtains the power signal, or a second control signal is provided to the controlled switch in order to turn off the controlled switch, by which the second screen array substrate fails to obtain the power signal, wherein the liquid crystal display further comprises a main screen scanning circuit, the driving circuit provides a second trigger signal to the main screen scanning circuit, the main screen scanning circuit responds to the second trigger signal so as to scan the main screen array substrate, ordering the main screen to display dynamically, wherein the second screen array substrate is designed as pixel embedded in memory, wherein the liquid crystal display further comprises a second screen scanning circuit, when the driving circuit provides the first control signal to the controlled switch, the first trigger signal is further provided to the second screen scanning circuit, the second screen scanning circuit responds to the first trigger circuit so as to scan the second screen array substrate, ordering the second screen to display dynamically, wherein the driving circuit provides the first control signal to the controlled switch, and when the first trigger signal is not provided to the second screen scanning circuit, the second screen scanning circuit discontinues scanning the second screen array substrate, ordering the second screen to display statically.

3. The liquid crystal display according to claim 2, wherein the controlled switch comprises a first controlled switch and a second controlled switch, the power source is equipped with a first power signal output terminal and a second power signal output terminal, the first power signal output terminal outputs a first power supply signal, the second power signal output terminal outputs a second power supply signal, the first controlled switch comprises a first controlled terminal, a first connection terminal and a second connection terminal, the second controlled switch comprises a second controlled terminal, a third connection terminal and a fourth connection terminal, the first power signal output terminal and a first power signal input terminal of the main screen array substrate connected, the second power signal output terminal and a second power signal input terminal of the main screen array substrate connected;

the first power signal output terminal and the first connection terminal connected, the second power signal output terminal and the third connection terminal connected, the second connection terminal and a first power signal input terminal of the second screen array substrate connected, the fourth connection terminal and a second power signal input terminal of the second screen array substrate connected; the first controlled terminal and the second controlled terminal connected;

the driving circuit providing the first control signal or the second control signal to the first controlled terminal.

4. The liquid crystal display according to claim 3, wherein the first power supply signal is high electric potential, the second power supply signal is low electric potential.

5. The liquid crystal display according to claim 3, wherein the first controlled switch and the second controlled switch are NPN-type triodes.

6. The liquid crystal display according to claim 3, wherein the first controlled switch and the second controlled switch are NMOS-type triodes.

7. An electronic device, wherein it comprises a liquid crystal display, the liquid crystal display comprises a main screen, a second screen, a driving circuit, a controlled switch and a power source, the second screen comprises a second screen array substrate, the main screen comprises a main screen array substrate, the power source provides a power supply signal to the main screen array substrate directly, and the power supply signal is provided to the second screen array substrate by the controlled switch, wherein the driving circuit provides a first control signal to the controlled switch in order to turn off the controlled switch, by which the second screen array substrate obtains the power supply signal, or a second control signal is provided to the controlled switch in order to turn off the controlled switch, by which the second screen array substrate fails to obtain the power supply signal, wherein the liquid crystal display further comprises a main screen scanning circuit, the driving circuit provides a second trigger signal to the main screen scanning circuit, the main screen scanning circuit responds to the second trigger signal so as to scan the main screen array substrate, ordering the main screen to display dynamically, wherein the second screen array substrate is designed as pixel embedded in memory, wherein the liquid crystal display further comprises a second screen scanning circuit, when the driving circuit provides the first control signal to the controlled switch, a first trigger signal is further provided to the second screen scanning circuit, the second screen scanning circuit responds to the first trigger circuit so as to scan the second screen array substrate, ordering the second screen to display dynamically, wherein the driving circuit provides the first control signal to the controlled switch, and when the first trigger signal is not provided to the second screen scanning circuit, the second screen scanning circuit discontinues scanning the second screen array substrate, ordering the second screen to display statically.

8. The electronic device according to claim 7, wherein the controlled switch comprises a first controlled switch and a second controlled switch, the power source is equipped with a first power signal output terminal and a second power signal output terminal, the first power signal output terminal outputs a first power supply signal, the second power signal output terminal outputs a second power supply signal, the first controlled switch comprises a first controlled terminal, a first connection terminal and a second connection terminal, the second controlled switch comprises a second controlled terminal, a third connection terminal and a fourth connection terminal, the first power signal output terminal and a first power signal input terminal of the main screen array substrate connected, the second power signal output terminal and a second power signal input terminal of the main screen array substrate connected;

the first power signal output terminal and the first connection terminal connected, the second power signal output terminal and the third connection terminal connected, the second connection terminal and a first power signal input terminal of the second screen array substrate connected, the fourth connection terminal and a second power signal input terminal of the second screen array substrate connected; the first controlled terminal and the second controlled terminal connected;

the driving circuit providing the first control signal or the second control signal to the first controlled terminal.

9. The electronic device according to claim 8, wherein the first power supply signal is high electric potential, the second power supply signal is low electric potential.

10. The electronic device according to claim 8, wherein the first controlled switch and the second controlled switch are NPN-type triodes.

11. The electronic device according to claim 8, wherein the first controlled switch and the second controlled switch are NMOS-type triodes.

* * * * *